United States Patent [19]

Hase

[11] Patent Number: 4,602,204
[45] Date of Patent: Jul. 22, 1986

[54] AUTO-START AND MAGNETIC SHUT DOWN BATTERY CHARGING AND SURVEILLANCE CIRCUITS

[76] Inventor: Alfred M. Hase, 6 Manorwood Road, Scarborough, Ontario, Canada, M1P 4G7

[21] Appl. No.: 700,037

[22] Filed: Feb. 11, 1985

[30] Foreign Application Priority Data

Nov. 2, 1984 [CA] Canada ................................ 467001

[51] Int. Cl.$^4$ ............................................. H02J 7/10
[52] U.S. Cl. ...................................... 320/30; 320/11; 320/39; 320/DIG. 2; 320/35; 320/48
[58] Field of Search ...................... 320/11, 27, 30, 39, 320/DIG. 2

[56] References Cited

U.S. PATENT DOCUMENTS

| | | | |
|---|---|---|---|
| 3,652,916 | 3/1972 | Ballman | 320/40 X |
| 3,735,233 | 5/1973 | Ringle | 320/39 X |
| 3,781,631 | 12/1973 | Nelson et al. | 320/39 X |
| 3,848,173 | 11/1974 | Hase | 320/23 |
| 4,320,333 | 3/1983 | Hase | 320/43 |
| 4,383,212 | 5/1979 | Ballman | 320/30 |
| 4,399,396 | 8/1983 | Hase | 320/43 |

FOREIGN PATENT DOCUMENTS 822798 9/1969 Canada.

Primary Examiner—Patrick R. Salce
Assistant Examiner—Mark D. Simpson
Attorney, Agent, or Firm—Donald E. Hewson

[57] ABSTRACT

Battery charging and surveillance circuits are provided which may have either shunt regulation or series regulation of the control coil. Automatic start up of the charging sequence is initiated when a battery is connected to the output terminals by providing a latch circuit which is powered from a capacitor charged from the high ripple voltage at the open output, which capacitor voltage collapses and causes a one-shot circuit to close, which closes a control power cut-off device in series with the control coil, thereby initiating a battery charging sequence. When the battery is to be disconnected, either a push button switch may be momentarily closed or a latch operates to open the cut-off device, thus causing the output voltage of the battery charging circuit to fall below that of the battery—the power diodes in the circuit preclude back-charge from the battery—so that the battery may then be disconnected without any substantial current flow and therefore without any arcing at the output terminals. No electromechanical AC power interruptors are required.

20 Claims, 3 Drawing Figures

AUTO-START AND MAGNETIC SHUT DOWN BATTERY CHARGING AND SURVEILLANCE CIRCUITS

FIELD OF THE INVENTION

This invention relates to battery charging and surveillance circuits, having automatic start-up when a battery is connected to the output terminals of the circuit; and which have magnetic shut-down to preclude arcing and the necessity for electro-mechanical circuit interruptors when a charged battery is disconnected from the charging circuit.

BACKGROUND OF THE INVENTION

Constant voltage float charge rectifier and battery surveillance circuits, including two-level constant voltage float charge rectifier and battery surveillance apparatus, are well known in the industry. The present inventor has provided several circuits and apparatus for battery charging in the past, including a circuit having an initial constant, high current output, which then transfers to a taper (constant voltage) output, and finally to a trickle (constant current) charge. That circuit is described in detail in HASE, U.S. Pat. No. 3,848,173, issued Nov. 12, 1974.

A further battery charger circuit, having full-time surveillance, is described in detail in HASE, U.S. Pat. No. 4,320,333, issued Mar. 16, 1982.

Yet a further, improved two-level battery charging circuit is described in detail in HASE, U.S. Pat. No. 4,399,396, issued Aug. 16, 1983.

It is well recognized that it may be desirable for there to be such surveillance of a battery charging sequence by battery charging circuits so as to provide an immediate indication that the charging sequence is in operation or that it has reached the trickle charge condition whereby the battery is substantially fully charged. Moreover, it may be desirable to provide an indication as to when the gassing point of the battery is reached, nominally and substantially at the point when the battery has received 80% of its charge—a condition at which the battery may be disconnected and put back into service, although such action is not recommended. It is also desirable for there to be an annunciation when there may be a battery problem, for example a shorted battery cell which absorbs higher rates of energy input beyond a time when a normal battery would have been charged so that the taper charging or trickle charging portions of a battery charging sequence should have been initiated.

The present circuits, to a greater or lesser extent in common with previous circuits as described in some other U.S. patents issued to the inventor, as noted above, give the required and desirable circuit operating annunciations.

Moreover, especially when batteries are charged between working shifts—for example, overnight—in many circumstances such as warehouses, industrial plants, mines and the like, it is desirable to have the battery charging sequence initiated automatically at the time that the battery is connected to the battery charging circuit; and it is also desirable to preclude arcing at the connection terminals when the battery is disconnected. Very often, such batteries are used to power fork lift trucks, industrial apparatus, or the like, and they work in a very rugged environment and sometimes in circumstances where they are not gently handled.

Not only are the ususal precautions of providing polarized connectors so that a battery may not be connected backwards to a battery charging circuit necessary, it has been found desirable to provide charging circuits that initiate the charging sequence merely by the act of connecting the battery to the charging circuit. It has also been found desirable to provide an annunciation by way of an illuminated lamp or other means to indicate that a battery should not be disconnected until it is at least 80% charged; and still further, to provide a means whereby the battery may be disconnected without drawing any substantial arc at the connecting terminals. The present invention provides such an arrangement by presenting a push button switch which, when momentarily depressed, causes the output voltage from the charging circuit to reduce and thereby reduces any output current to a leakage current at best. Of course, it is recognized that the power diodes in a charging circuit then act to block the circuit from becoming a load on the battery, and thereby to preclude discharge from the battery.

At the same time, provision of magnetic shut down—by which the operation of the synchronous switch means which controls the rate of electrical energy input to the storage battery, is substantially arrested, to make the circuit operation more reliable and so that there is substantially no energy transfer across the input transformer to the battery charger—precludes the necessity for providing electro-mechanical circuit interruptors, contactors or other mechanical and high current circuit interrupting means so as to preclude arcing damage either to the battery or the output terminals when the battery is disconnected. Thus, the additional capital expense of providing electro-mechanical circuit interruptor means is precluded, as is the additional operating expense of having to maintain and replace connectors where arcing has occurred, as with other battery charging circuits.

This is not to say, however, that it may be desirable in certain circumstances, depending on the industrial environment in which a battery charging and surveillance circuit according to the present invention is being used, to provide a hold-down means by which the battery may not be disconnected until such time as the shut-down sequence has occurred by which the output voltage of the charging circuit has been reduced below that of the battery.

It is also recognized by the present invention that a battery may be charged and used under low or high temperature extremes. For example, many industrial batteries work at all times at low temperatures such as those that are found in refrigerated warehouses, to the extent that they are not removed from such low temperature ambient even when being charged. Likewise, other industrial batteries may be at all times in or near industrial ovens or otherwise exposed to high average ambient temperatures, even when being charged. Because batteries have negative temperature co-efficients as to their internal resistance, it is therefore appropriate in some circumstances to provide an inverse temperature compensation whereby the output voltage of the charging circuit may be modulated inversely to changes of temperature when the batteries are at extremes of high or low temperature ambient conditions.

It is also desirable that, when a battery charging sequence is initiated, there should be soft walk-in, whereby when any one battery or even a number of batteries are connected to battery chargers, there is no overburden on the AC system from which battery charging energy shall be drawn. This also, therefore, precludes any in-rush currents on either the AC or DC sides of the battery chargers, or their source. When a number of high capacity batteries may be used, and power utility charges are based on peak current requirements, the requirement for soft walk-in and substantially low or no in-rush currents may become important.

It is also desirable that the solid-state devices that are used should normally be rated both as to voltage and current handling requirements at any circuit point where they may be connected, so that they are not over-stressed. Indeed, it is a feature of the present invention that the control power cut-off device that may be used in series with the control coil of the synchronous switch which controls the rate of electrical energy input, may be a low current and therefore a low heat device.

In that regard, solid-state devices that may be appropriate for use will be those that, when the operation of the circuits of the present invention are explained, may be chosen by the skilled practitioner as being those which are appropriate to the current and voltage operating characteristics at the circuit point where they will be used. Thus, the solid-state devices may be transistors, HEXFET or CMOS devices, silicon controlled rectifiers (SCR's); or indeed highly reliable, low-current relays may be used.

The above are broadly stated descriptions of certain of the features and functions of the apparatus of the present invention, discussed in greater detail hereafter.

In general terms, the present invention provides a battery charging and surveillance circuit having fulltime battery and circuit operation surveillance, the circuit being adapted for connection at its input to a source of alternating current electrical energy and at its output to a storage battery. At its input, the circuit has a synchronous switch means having a control coil—which may be a saturable reactor, a magnetic amplifier, equivalent SCR circuitry, or otherwise—whereby operation of the control coil controls the rate of electrical energy input to the storage battery when it is connected to the circuit. The act of connecting the storage battery to the output terminals of the charging circuit automatically initiates a battery charging sequence, as discussed in detail hereafter.

In keeping with the present invention, an auxiliary power supply circuit is found within the charging circuit across the output thereof, which auxiliary power supply circuit is subjected to a high ripple voltage when there is no battery load on the charging circuit. Within the auxiliary power supply there is a capacitor which may be charged to a predetermined bias voltage, and which is charged to that voltage when there is no battery connected to the output terminals of the charging circuit. Impedance means is provided to reduce the ripple voltage below a predermined level when a battery is connected to the output. A latch is provided, which is a solid-state device connected to the auxiliary power supply, and which has its base in series with a zener diode so that the predetermined bias voltage on the capacitor is the zener voltage of the zener diode plus the base-emitter voltage of the device. The bias voltage of the capacitor is sufficient to bias the solid-state device of the latch circuit to a closed, conductive, state.

A one-shot start-up circuit means is provided that has a second solid-state device that will be momentarily closed just below the zener voltage of the capacitor, when the capacitor voltage is collapsing. A control power cut-off solid-state device is provided in series with the control coil, the cut-off device being biassed to an open, non-conductive, condition when there is no battery load on the charging circuit; and a second latch is connected to the one-shot start-up circuit and to the cut-off device, the second latch being biassed to close the cut-off device when the one-shot start-up circuit closes to its conductive state.

The impedance means in the auxiliary power supply circuit acts to cause collapse of the capacitor voltage when a battery is connected to the output of the charging circuit.

There is also provided in the battery charging and surveillance circuit a momentary close switch which is connected in such a manner that, when it is closed, the second latch is biassed to a closed condition and the cut-off device is opened. Under those circumstances, the current in the control coil collapses, and therefore the output of the synchronous switch means reduces so as to reduce the output voltage of the charging circuit. When the switch is momentarily closed, and the output voltage of the charging circuit is reduced below the terminal voltage of the battery connected to the output terminals of the charging circuit, the battery may then be disconnected from the charging circuit without any substantial current flow at its connecting terminals, and therefore without arcing.

Other additional and/or optional features and operating sub-systems of the apparatus according to the present invention, as well as the principals of operation thereof, are set out hereafter.

BRIEF DESCRIPTION OF THE DRAWINGS

The following discussion is made in association with the accompanying drawings, in which.

DESCRIPTION OF THE PREFERRED EMBODIMENTS

Figure 1:
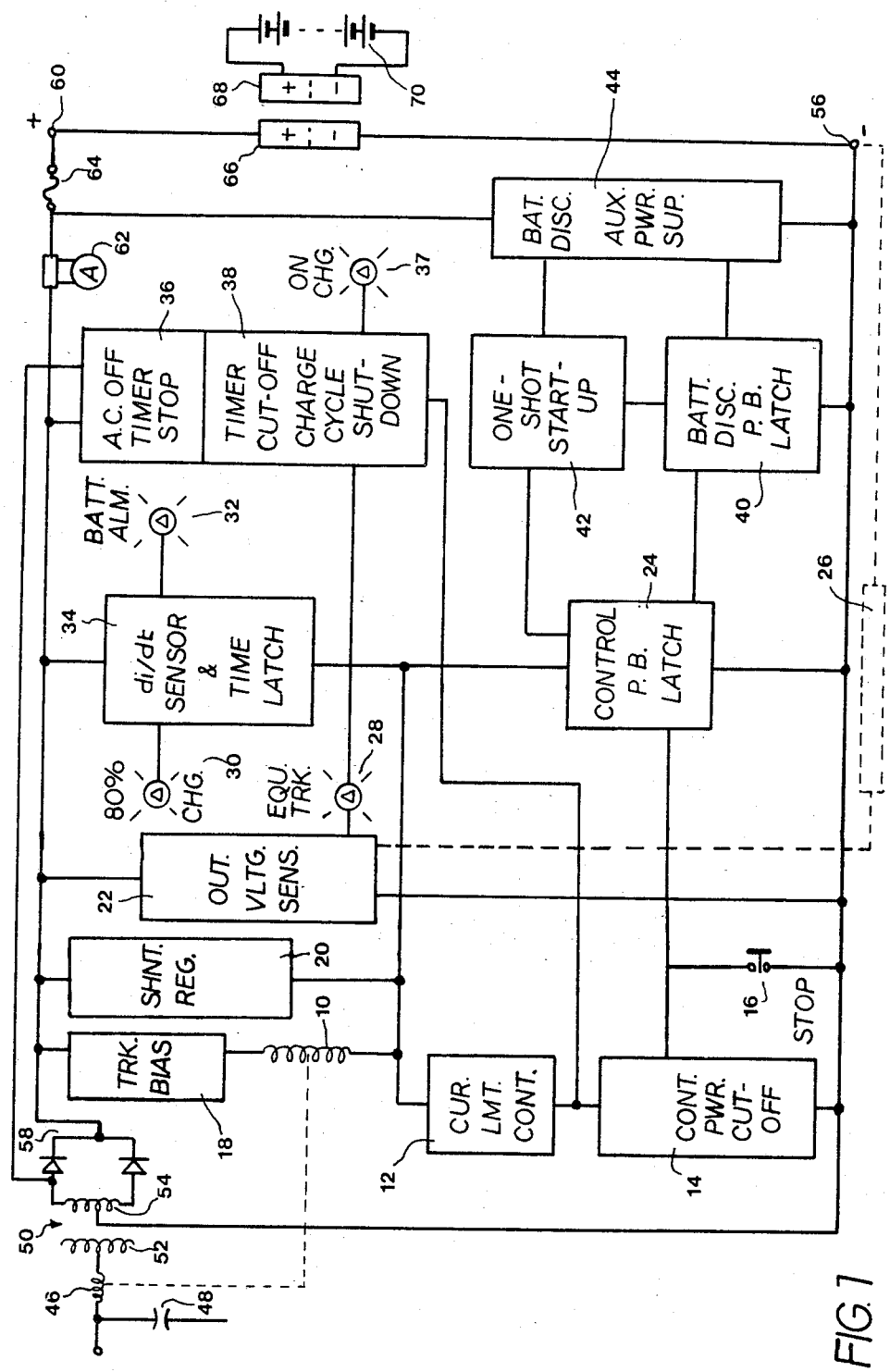
FIG. 1 is a block circuit diagram of the principal operating features and modules of a circuit according to the present invention, when in a shunt regulating configuration.
Figure 2:
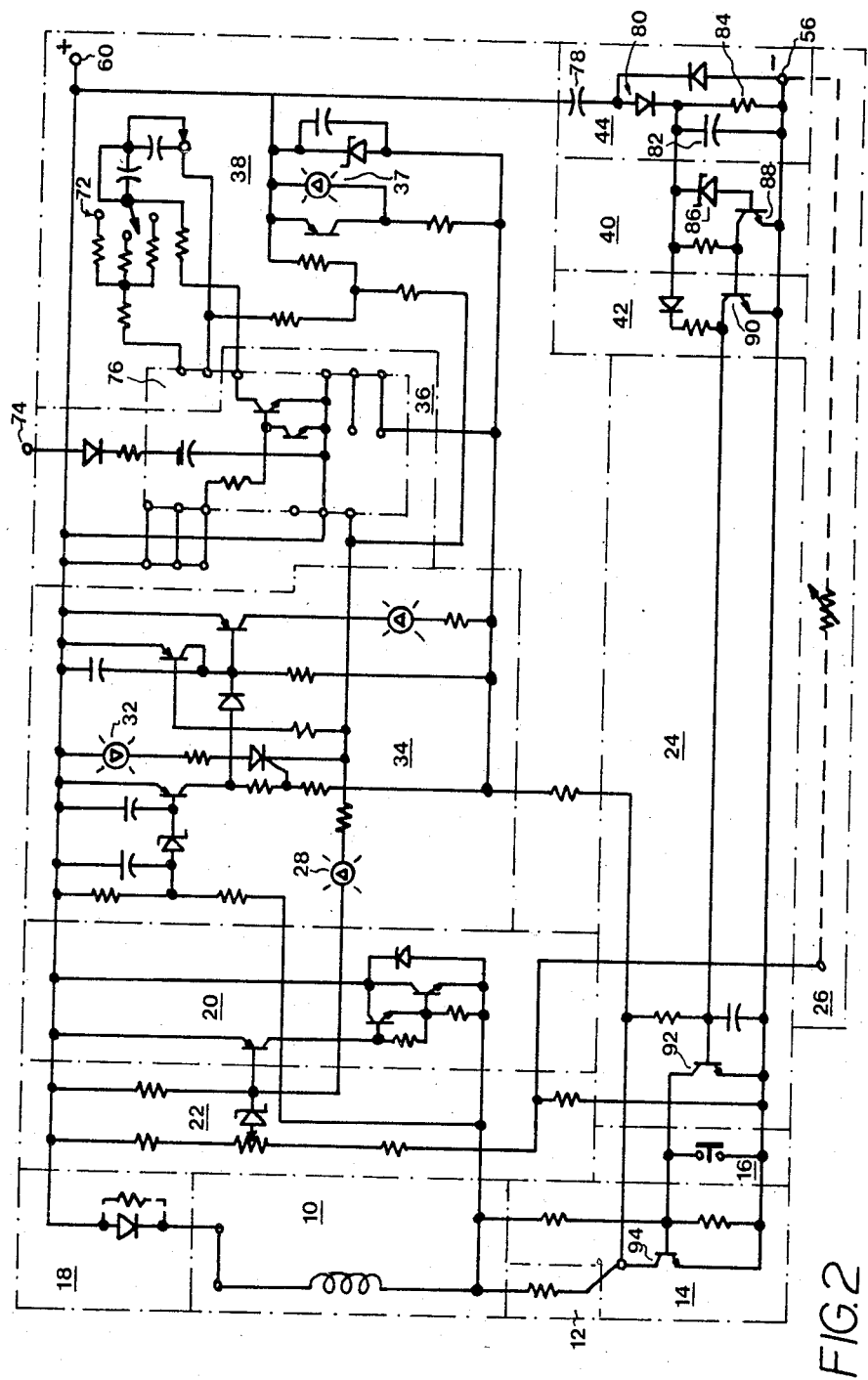
FIG. 2 is a typical schematic circuit of the principal portions and modules of the circuit of FIG. 1.
Figure 3:
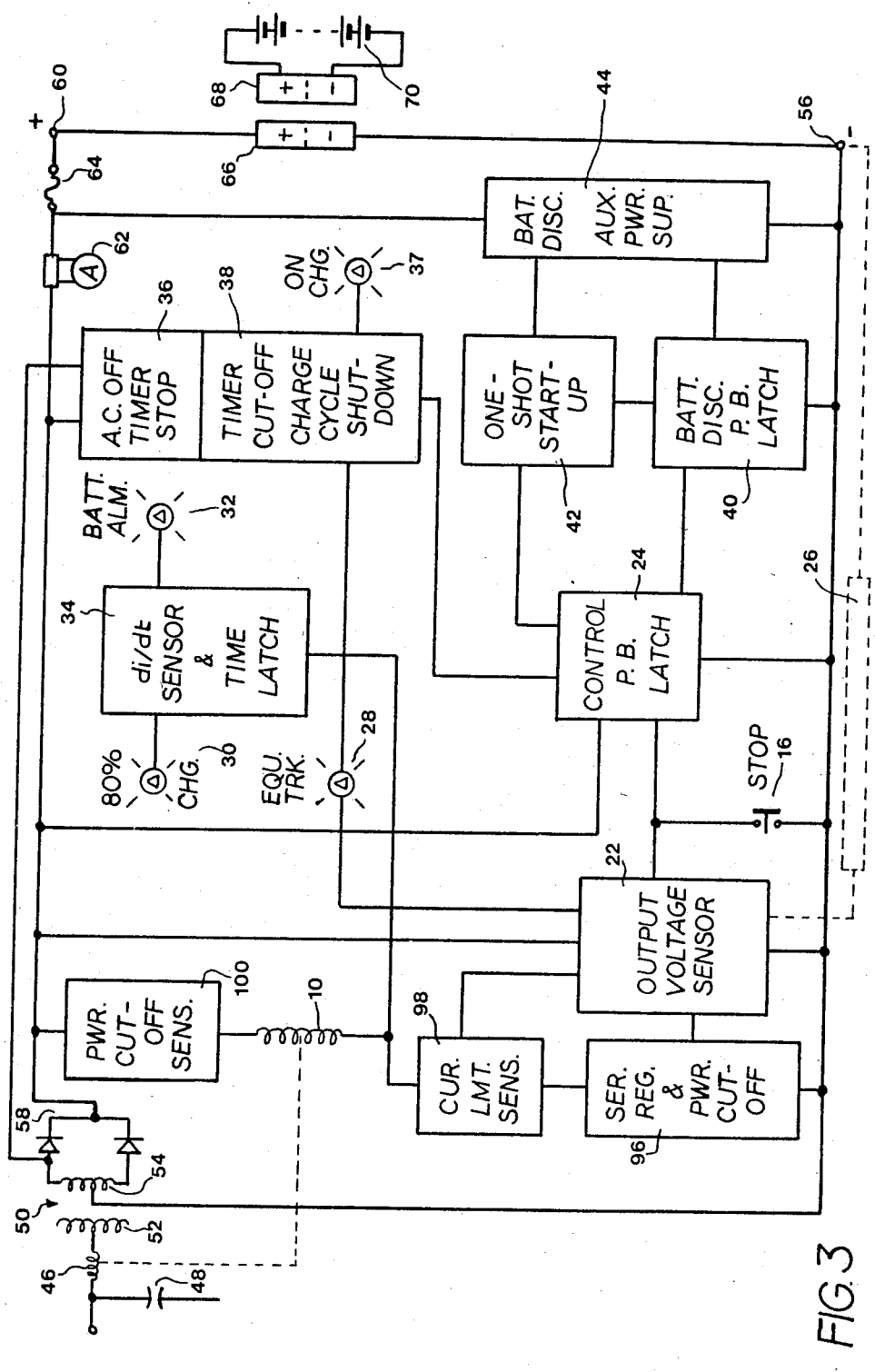
FIG. 3 is a similar circuit to that of FIG. 1, except showing certain different modules when the charging circuit is in a series regulating configuration.

The following discussion is primarily directed to the circuits of FIGS. 1 and 2. By inspection, it will be noted that the circuit of FIG. 3 is not dissimilar to that of FIG. 1; the only significant difference between them being that the circuit of FIG. 1 is a preferred embodiment whereby the control coil is shunt regulated, wheras the circuit of FIG. 3 is one where the regulator is in series with the control coil. Thus, a number of the modules shown in FIG. 3 have the same reference numerals as those of FIG. 1, because they are otherwise identical.

Shunt regulation, generally, is taught in detail in applicant's prior Canadian Pat. No. 822,798, issued Sept. 9, 1969. Briefly, the shunt regulator circuits are in parallel—shunt—with the control coil, rather than in series, a configuration which is intrinsically more fail-safe; and such circumstances would collapse the voltage on a control coil rather than permitting it to go high. However, recognizing the advancement in solid-state device technology, and in the present circuits where a skilled practitioner (when he learns the circuits, and determines the function of various circuit components) can choose over-rated devices, there is less likelihood of overstressing any device and thereby causing failure due to voltage or current stresses beyond that for which the device has been designed.

It will also be noted that, because industrial batteries may have terminal voltages and ampere capacities that may vary from 12 to 76 volts or more, and from a few hundred to several thousand amp-hours capacity, no values for any of the circuit components shown in the typical circuit of FIG. 2 are given. The circuit values would, of necessity, vary depending on the voltage rating of the battery for which the charger is being designed; and, of course, it is evident that a skilled practitioner can substitute one device for another device, or a circuit sub-system for another circuit sub-system, without departing from the general operation of the circuit or, indeed, from the scope of the claims appended hereto.

The principal circuit components that are referred to hereafter, are as follows:
the control coil, 10
the current limit control module, 12
the control power cut-off device, 14
the push button switch, 16
the trickle bias module, 18
the shunt regulator, 20
the output voltage sensing module, 22
the control push button latch, 24
the optional ambient or battery temperature sensor, 26
the on-equalize or trickle charging annunicator, 28
the 80% of charge annunicator, 30
the battery alarm annunicator, 32
the rate of charge (di/dt sensor) and time latch, 34
the AC-off timer stop module, 36
the on-charge annunciator, 37
the timer/cut-off/charge cycle shut-down module, 38
the battery disconnect push button latch, 40
the one-shot start-up module, 42
the battery disconnected auxiliary power supply, 44

In addition, in each of FIGS. 1 and 3, there are shown the saturable reactor or other synchronous switch means 46, which in any event has the control coil 10; an input magnetizing current Power Factor correcting capacitor 48; the input power transformer 50 having a primary winding 52 and a secondary winding 54, the centre tap of which is connected to the negative output terminal 56; and a full-wave rectifier 58 whose output is connected to positive output terminal 60—preferably through an ammeter shunt 62 and a fuse element 64. A pair of connector elements 66 and 68, preferably polarized, is provided to effect the physical connection and disconnection of the battery 70 to the charging circuit.

With reference to FIG. 2, most of the modules and circuit components, especially those having reference numerals ranging from 10 to (44), are indicated by dashed lines superimposed over the typical circuit. Certain optional elements, such as the temperature sensing element 26, which may be a thermistor, and a shunt resistor to the trickle bias control diode in module 18, are also shown.

Obviously, when a thermistor is being used, it forms part of a resistor string which is part of the output voltage sensing module 22. The thermistor acts to compensate for the negative temperature co-efficient of the internal battery resistance at high or low temperatures, and is usually mounted on the underside of the charger cabinet in exposure to the ambient where the battery is also located, or otherwise in proximity to the battery.

Other incidental features, beyond the specific modules and their operation as will be discussed hereafter, that are shown in FIG. 2 include the timer over-ride circuitry 72 in module 38. That circuit permits setting the battery charging circuit so that an interval of time may be arranged to charge a battery that may have 100%, 150% or 200% of the name plate rating of the charger. In other words, a battery having 100% of the name plate rating would require the over-ride setting to be set at 100%, and normally would be fully charged in 8 hours; whereas batteries having 150% or 200% of the name plate rating would require the appropriate settings on the timer over-ride circuits and would require 12 or 16 hours, respectively, to reach full charge.

It should also be noted that FIG. 2 contemplates that the control coil 10, and thereby the synchronous switch which the control coil controls, may be either a single phase or a three phase device.

An AC-off timer stop or AC latch is indicated by module 36. It comprises an external terminal 74 to which is connected a diode and resistor string, and it is connected to internal devices within an integrated circuit (IC) 76 such that if the alternating current source fails, the operation of the timer which is also within the IC 76 stops.

Assuming, first, that the battery charging and surveillance circuit does not have a battery connected to it, it is recognized that there will be, in any event, some energy flow to the transformer 50, so that there is at least a high ripple voltage under no-load conditions across the output terminals 60,56 of the circuit. Capacitor 78 is an AC capacitor, which isolates the terminals in a DC sense but is conductive through a full wave rectifier 80 so as to charge a capacitor 82 to a predetermined voltage which is set by the impedance means (usually a resistor) 84. Among other things, the auxiliary power supply 44 contributes to holding the transistor or other device in the push button latch 24 so as to lock out the power cut-off device in the module 14. When a battery 70 is connected through connectors 66,68, there is no longer a high ripple voltage across the output terminals 60,56, and the voltage on the capacitor 82 begins to collapse, by discharging through the resistor 84 and also through the zener/device string comprised of the zener diode 86 and the transistor or other suitable solid-state device 88. (The zener/device string 86,88 is found in the push button latch module 40.) As the voltage on capacitor 82 is collapsing, it goes through the "knee" or zener voltage of the zener diode 86, and the device 88 will momentarily close just below the zener voltage.

As the device 88 closes, that in turn momentarily biasses the device 90 in the one-shot start-up module 42, and that in turn will bias the device 92 in the push-button latch 24. When the device 92 closes, it is then in shunt relation to the power cut-off device 94 in module 14, and it in turn closes to pick up the voltage across the current limiting control module 12, and thereby to initiate flow of current through the control coil 10.

It will be seen that there is a gradual pick up, limited by the current limit control 12, and under the control of the output voltage sensor 22, so that a soft walk-in of the charging circuit is achieved, and there is no high in-rush current to the circuit.

The charging operation or sequence may be much the same as that which is described in applicant's prior U.S. Pat. No. 4,320,333, referred to above.

It is obvious that there is no substantial voltage stress on the device 94, and moreover that it is generally such as to be operating at relatively low current. There is, therefore, no undue heating effect, no wasted energy, no drifting of the device due to heating, and an intrinsic fail-safe condition.

With brief reference to FIG. 3, it will be seen that the general operation is the same, except that the series regulator and power cut-off module 96 is in series with the current limiting sensor module 98, and in series with the power cut-off sensing module 100. The series regulator and power cut-off module 96 will, of course, contain the power cut-off device 94. The output voltage sensor 22 acts across the current limiting sensing module 98 and the series regulator and power cut-off module 96, and there is the necessity for the power cut-off sensor 100 to preclude overloading when the charging circuit shuts down and to preclude in-rush circuits when the charging circuit starts up.

When the battery 70 is to be disconnected from the charging circuit, preferably not until the 80% charge annunciator 30 is illuminated, the operator closes the push button switch 16. The circuits are arranged so that all the annunciators will turn off, and the switch is spring loaded so that when it is released the momentary close switch will again open.

During a charging operation, the device 92 in the control push button latch 24 is closed; and momentary closing of the push button 16 will shunt the device 92 and open the power cut-off device 94 (including the power cut-off device in module 96 of FIG. 3). In any event, when the power cut-off device is opened, the voltage across the current limit control module 12 (or the current limiting sensor module 98 of FIG. 3) is blocked, and the voltage goes to the positive side of the circuit. The device 92 may then latch, bringing down the output voltage of the charging circuit—which, in any event, is reducing due to the loss of current in the control coil 10—so that the output voltage reduces to below that of the terminal voltage of the battery 70. Because the power diodes in the rectifier 58 substantially isolate the battery, there is no charge-back current drawn from the battery to the high power, high current components of the battery charging circuit. Therefore, the battery 70 may be easily disconnected by manipulating the connectors 66 and 68 without any substantial arc being drawn at the connecting terminals or posts of the connectors.

Of course, it is understood that there may be a very slight leakage current at the connector terminals, but that current may be only in terms of milliamperes as opposed to possibly hundreds of amperes, or even a trickle charge of several amperes, previously.

Once the battery 70 has been removed, the ripple sensor which comprises the AC capacitor 78 permits re-establishment of the bias voltage on capacitor 82, and the circuit is ready once again for connection and automatic start-up of a new charging sequence.

In the event of battery failure, or a detected current or voltage characteristic beyond that which has been anticipated at any moment in time by the internal circuits of the IC 76, the battery alarm circuitry will operate, and at the same time it will function to open the device 92 and unbias the power cut-off device 94. There is, therefore, a fail-safe mode of operation, even in battery failure conditions. Of course, at the time that a battery charging sequence is initiated, operation of the timer within IC 76 is also initiated—subject only to its being stopped under the control of the AC-off timer stop module 36—so that the operation of the charging circuit may be over-ridden by the timing circuit. It is therefore important to be sure that the timer over-ride setting at the sub-circuit 72 is correct for the rating of the battery and the rating of the charging circuit apparatus to which the battery is connected.

The current limiting and current limit sensing means in modules 12 or 98 function to provide constant current output at high charge currents. That is, when the battery has first been connected and has a low charge condition, the current limiting means acts to permit current up to a predetermined value but not higher, at the time when the charger is operating in a high constant current mode. When the charge reaches a predetermined level, or at a predetermined point in time, a constant voltage charging mode then begins.

In the series regulated circuit which is generally indicated in FIG. 3, it is of course evident that the control power cut-off device and the output voltage sensor may be combined in the same device.

The above discussion has shown two general approaches which differ only in the detail that regulation of the control coil may either be by shunt or in series; but which otherwise are substantially identical, particularly as to operation of the automatic start-up circuits within the charging apparatus and the magnetic shut down procedure. A typical circuit has been shown, which substantially emulates an operating circuit intended for a commercial apparatus but without any reference either to the identity of the devices or the value of any of the circuit components—those matters being not only matters of choice and convenience and accessibility to devices, but as may be dictated due to the current and operating characteristics as are defined by the power rating of the apparatus. Obvious alternative devices have been considered, including high reliability relays when appropriate; and different synchronous switch means have been referred to. Other circuit components may be chosen, or circuit modifications made, without departing from the spirit and scope of the appended claims.

I claim:

1. A battery charging and surveillance circuit having full-time battery and circuit operation surveillance, and which is adapted for connection at its input to a source of alternating current electrical energy and at its output to a storage battery;

said battery charging and surveillance circuit having at its input a synchronous switch means having a control coil, where the operation of said control coil controls said synchronous switch means to thereby control the rate of electrical energy input to said storage battery when connected to said circuit;

and where a battery charging operation is automatically initiated when a storage battery is connected to the output terminals of said battery charging and surveillance circuit;

there being an auxiliary power supply circuit within said battery charging and surveillance circuit and across the output thereof, having a capacitor which may be charged to a predetermined bias voltage;

said battery charging and surveillance circuit having an input power transformer to which there is sufficient energy flow at no load conditions of said circuit such that a ripple voltage above a predetermined level appears at said output terminals, and an impedance means to reduce said ripple voltage below said predetermined level when a battery is connected to said output terminals;

a latch circuit connected to said auxiliary power supply, and having a first solid-state device whose base is in series with a zener diode such that the bias voltage on said capacitor is the zener voltage of said zener diode plus the base-emitter voltage of said first solid-state device, and where the bias voltage of said capacitor is sufficient to bias said first solid-state device to a closed, conductive, state;

a one-shot start-up circuit means having a second solid-state device which will be momentarily closed below said zener voltage across said capacitor when the capacitor voltage is collapsing;

a control power cut-off solid-state device in series with said control coil, said cut-off device being biassed to an open, non-conductive, condition when there is no battery load on said battery charging and surveillance circuit;

a second latch which is connected to said one-shot start-up circuit means and to said cut-off device, said second latch being biassed to close said cut-off device when said second solid-state device in said one-shot start-up circuit means closes;

where said impedance means acts to cause collapse of said capacitor voltage when a battery is connected to said output terminals of said battery charging and surveillance circuit.

2. The battery charging and surveillance circuit of claim 1, having a momentary close switch connected in a manner such that, when closed, said second latch is biassed closed and said cut-off device is opened, thereby causing the current in said control coil to collapse and therefore the output of said synchronous switch means to reduce so as to reduce the output voltage of said charging circuit;

whereby when said switch is momentarily closed, the output voltage of said battery charging and surveillance circuit may be reduced below the terminal voltage of a battery connected to said output terminals, and said battery may then be disconnected without any substantial current flow at its connecting terminals.

3. The battery charging and surveillance circuit of claim 2, where operation of said control coil is under the control of a regulator in shunt connection with said control coil, which regulator is driven by an output voltage sensor.

4. The battery charging and surveillance circuit of claim 2, where operation of said control coil is under the control of a regulator which is in series with said control coil and said control power cut-off device, which regulator is driven by an output voltage sensor.

5. The battery charging and surveillance circuit of claim 4, where a current limiting control sensor is in series with said control coil, and acts with the regulator to control and limit the maximum current output of said battery charging and surveillance circuit during a battery charging procedure.

6. The battery charging and surveillance circuit of claim 2, where said charging operation may be overridden by a timing circuit, whose operation is initiated at the time that the battery is connected to said output terminals.

7. The battery charging and surveillance circuit of claim 3, further comprising temperature sensing means co-acting with said output voltage sensor, to modulate control of the output voltage of said battery charging and surveillance circuit inversely to changes of temperature detected by said sensing means under high and low extremes of temperature conditions of a battery being charged.

8. The battery charging and surveillance circuit of claim 4, further comprising temperature sensing means co-acting with said output voltage sensor, to modulate control of the output voltage of said battery charging and surveillance circuit inversely to changes of temperature detected by said sensing means under high and low extremes of temperature conditions of a battery being charged.

9. The battery charging and surveillance circuit of claim 6, further comprising a latch in series with the alternating current source and said timing circuit, whereby failure of said alternating current source is sensed by said latch and stops operation of said timing circuit.

10. The battery charging and surveillance circuit of claim 3, having current limiting means which acts to provide constant current output at high charge currents.

11. The battery charging and surveillance circuit of claim 4, having current limiting means which acts to provide constant current output at high charge currents.

12. The battery charging and surveillance circuit of claim 2, where operation of said control coil is under the control of a regulator which is in series with said control coil and said control power cut-off device, which regulator is driven by an output voltage sensor; where said control power cut-off device and said output voltage sensor are combined in the same device.

13. The battery charging and surveillance circuit of claim 1, where each of said first, second and cut-off solid-state devices may be chosen from the group comprising transistors, HEXFET devices, CMOS devices, or SCR's, and where each of said solid-state devices is properly rated for the voltage and current handling requirement of the circuit point where such solid-state device is connected.

14. A battery charging and surveillance circuit having full-time battery and circuit operation surveillance, and which is adapted for connection at its input to a source of alternating current electrical energy and at its output to a storage battery;

said battery charging and surveillance circuit having at its input a synchronous switch means having a control coil, where the operation of said control coil controls said synchronous switch means to thereby control the rate of electrical energy input to said storage battery when connected to said circuit;

and where a battery charging operation is automatically initiated when a storage battery is connected to the output terminals of said battery charging and surveillance circuit;

there being an auxiliary power supply circuit within said battery charging and surveillance circuit and across the output thereof, having a capacitor which may be charged to a predetermined bias voltage;

said battery charging and surveillance circuit having an input power transformer to which there is sufficient energy flow at no load conditions of said circuit such that a ripple voltage above a predetermined level appears at said output terminals, and an impedance means to reduce said ripple voltage below said predetermined level when a battery is connected to said output terminals;

a latch circuit connected to said auxiliary power supply, and having a first relay device in series with a zener diode such that the bias voltage on said capacitor is the zener voltage of said zener diode plus the lock-in voltage of said first relay device, and where the bias voltage across said capacitor is sufficient to bias said first relay device to a closed, conductive, state;

a one-shot start-up circuit means having a second relay device which will be momentarily closed below said zener voltage across said capacitor when the capacitor voltage is collapsing;

a control power cut-off relay device in series with said control coil, said cut-off device being biassed to an open, non-conductive, condition when there is no battery load on said battery charging and surveillance circuit;

a second latch which is connected to said one-shot start-up circuit means and to said cut-off relay device, said second latch being biassed to close said cut-off relay device when said second relay device in said one-shot start-up circuit means closes;

where said impedance means acts to cause collapse of said capacitor voltage when a battery is connected to said output terminals of said battery charging and surveillance circuit.

15. The battery charging and surveillance circuit of claim 14, having a momentary close switch connected in a manner such that, when closed, said second latch is biassed closed and said cut-off relay device is opened, thereby causing the current in said control coil to collapse and therefore the output of said synchronous switch means to reduce so as to reduce the output voltage of said charging circuit;

whereby when said switch is momentarily closed, the output voltage of said battery charging and surveillance circuit may be reduced below the terminal voltage of a battery connected to said output terminals, and said battery may then be disconnected without any substantial current flow at its connecting terminals.

16. The battery charging and surveillance circuit of claim 3, where operation of said control coil is under the control of a regulator in shunt connection with said control coil, which regulator is driven by an output voltage sensor.

17. The battery charging and surveillance circuit of claim 15, where said charging operation may be overridden by a timing circuit, whose operation is initiated at the time that the battery is connected to said output terminals.

18. The battery charging and surveillance circuit of claim 16, further comprising temperature sensing means co-acting with said output voltage sensor, to modulate control of the output voltage of said battery charging and surveillance circuit inversely to changes of temperature detected by said sensing means under high and low extremes of temperature conditions of a battery being charged.

19. The battery charging and surveillance circuit of claim 17, further comprising a latch in series with the alternating current source and said timing circuit, whereby failure of said alternating current source is sensed by said latch and stops operation of said timing circuit.

20. The battery charging and surveillance circuit of claim 16, having current limiting means which acts to provide constant current output at high charge currents.

* * * * *